Aug. 18, 1959    V. S. FIRESTONE    2,899,967
CONVEYOR AND WASHER FOR ELONGATED PLATES
Filed Feb. 17, 1955    2 Sheets-Sheet 1
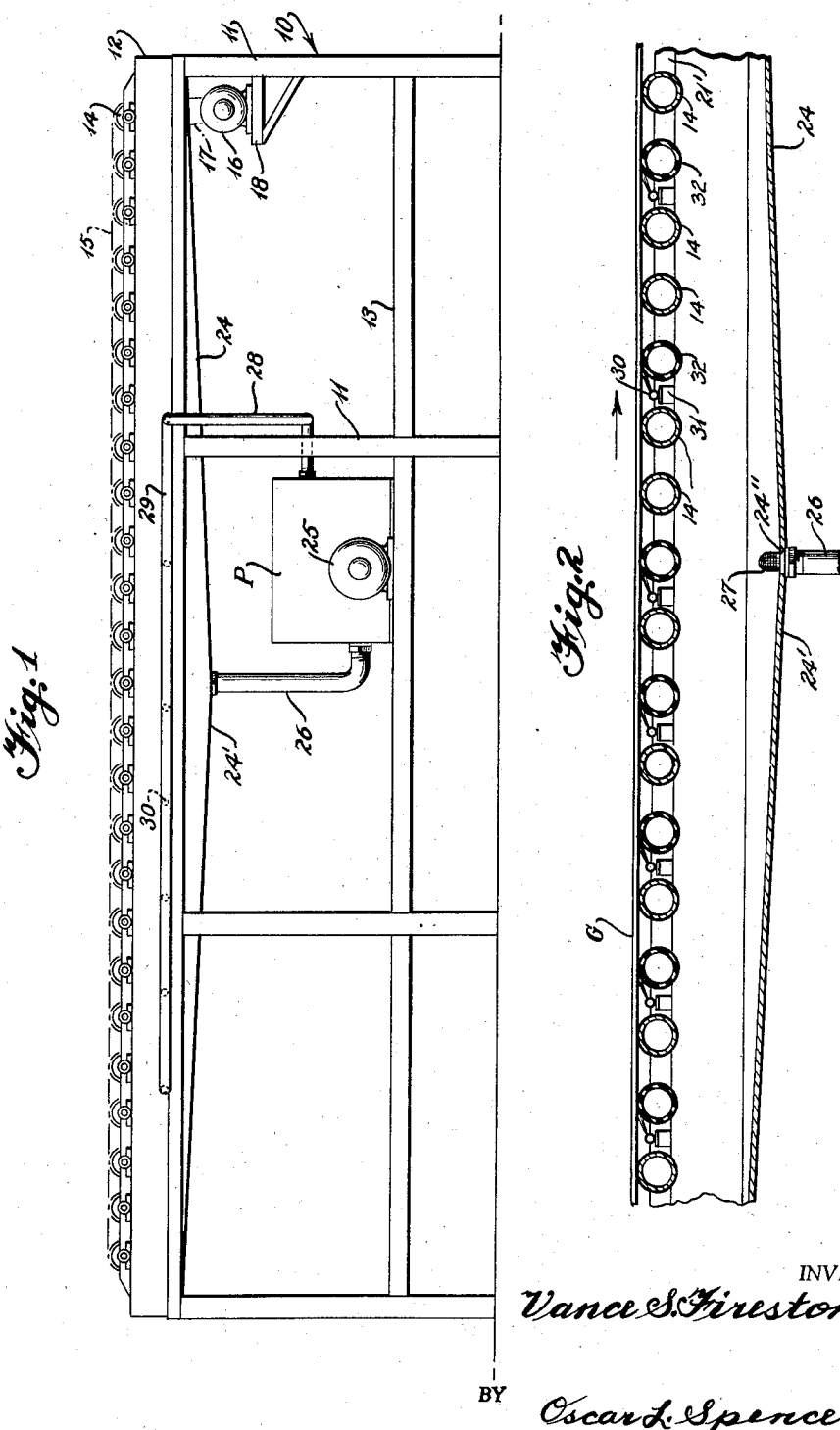
INVENTOR
Vance S. Firestone
BY Oscar L. Spencer
ATTORNEY Aug. 18, 1959   V. S. FIRESTONE   2,899,967
CONVEYOR AND WASHER FOR ELONGATED PLATES
Filed Feb. 17, 1955   2 Sheets-Sheet 2

INVENTOR
Vance S. Firestone

BY Oscar L. Spencer
ATTORNEY

United States Patent Office 2,899,967
Patented Aug. 18, 1959

2,899,967

CONVEYOR AND WASHER FOR ELONGATED PLATES

Vance S. Firestone, Ford City, Pa., assignor to Pittsburgh Plate Glass Company, Allegheny County, Pa., a corporation of Pennsylvania Application February 17, 1955, Serial No. 488,903

4 Claims. (Cl. 134—63)

My invention is directed to improvements in a combined conveyor and washer for elongated plates.

In the manufacture of glass plates and particularly in the grinding and polishing line it becomes necessary to remove plaster of Paris and other setting material from the underneath side of the plates. Heretofore in carrying this out, the plates of glass have been conveyed on horizontally disposed power-driven rollers and there has been positioned intermediate some of the rollers elongated spray tubes which spray cleaning fluid up onto the underneath side of the plates of glass. This cleaning fluid contains dilute acids such as hydrochloric acid which tends to crumble the plaster and make it easier for the plaster to be removed from the underneath side of the glass plates. Directing the sprays upward onto the glass surface of the underneath side has not been very efficient as there has been limited contact and the spray applicator tubes of necessity had to extend completely across the glass. From time to time, pieces of plaster falling from the under surface of the glass partially clogged the holes of the spray tubes, thereby causing the spray to be directed at angles other than in the vertical plane of application to the underneath surface of the moving glass plate. This further resulted in the spray being deposited beyond the extreme lateral edges of the moving glass onto vital equipment of the conveyor, and on personnel tending the conveyor mechanism.

In the apparatus according to my invention, a transversely oriented plastic acid-resistant spray tube is located behind the conveyor rolls and the spray solution is directed at the line of contact between the glass under surface and the periphery of the neighboring roll. By using a rubber-coated roll as wide as the glass plate being conveyed and cleaned, a continuous pool of acid solution is formed at this line of contact. This pool provides a more uniform wetting action on the plaster and enhances the crumbling of the plaster resulting from the reaction with the acid. The crushing action on the plaster and other setting material on the underneath surface of the glass as it passes over the coated roll is increased due to the more thorough cracking of the plaster resulting from a longer exposure of the plaster to the acid solution and use of the rubber-coated rolls which are rigid enough to support the plates yet flexible enough to yield somewhat to assist in crumbling the plaster. This arrangement provides a combined chemical and mechanical action on the plaster on the glass plates followed by mechanical crushing of plaster encrusted on the plates as they pass over hard surface primary rolls. The combined chemical and mechanical action takes place, for example, through the softening action of the cleaning fluid solution of acid materials S applied to the coated undersurface of the plate at the nip between the coated undersurface of the plate G and the supporting rubber covered secondary roll that has yieldability through the selected rubber or elastomer covering hardness. Following this there is a separate and distinct crushing and breaking action on the softened plaster coating by the action of the hard surface primary roll 34.

The primary object of my invention is to provide a uniform pool of cleaning fluid in contact with the underneath surface of a plate being conveyed and cleaned on rollers.

A further object of my invention is to provide a pool of cleaning fluid at the contact surface between a support and conveyor roller and the underneath surface of an elongated plate being conveyed thereover.

A still further object of my invention is to provide spray-applying nozzles to apply on acid-containing fluid onto an acid-resistant covered roll having fluid deflector elements at the end thereof to prevent the fluid projected against the roll from leaving the ends of the roll.

Another object of my invention is to provide an elongated spray tube positioned adjacent a roll over which a plate is transferred so that the spray tube sprays fluid at the contact line between the plate and the roll to provide a continuous bath of fluid in contact with the plate and wherein the roll has deflector elements at the ends thereof to prevent the fluid from leaving the ends of the roll.

Yet a still further object of my invention is to provide an apparatus for conveying and cleaning plate material wherein a plurality of parallel spaced-apart rollers are power driven and convey a plate thereon and wherein spray tubes are positioned between certain rollers and spray cleaning fluid at the point of contact of the plate with the neighboring roll with means being provided to collect, filter and recirculate the cleaning fluid which falls from said apparatus.

Another object of my invention is to provide in an apparatus for conveying and cleaning plaster material from plates, rubber-coated rolls which resist attack of cleaning fluid containing acid, are rigid enough to support the plates conveyed thereover yet are flexible enough to yield somewhat to assist in crumbling the plaster in contact therewith.

Still further objects and the entire scope of applicability of the present invention will become apparent from the detailed description given hereinafter; it should be understood, however, that the detailed description and specific example is given by way of illustration only and, while indicating the preferred embodiment of the invention, is not given by way of limitation, since various changes and modifications within the spirit and scope of the invention will become apparent to those skilled in the art from this detailed description.

For a more complete understanding of the nature and scope of my invention reference may be had to the following description taken in conjunction with the drawing in which:

Fig. 1 is a side elevational view of the conveyor and cleaning apparatus according to my invention;

Fig. 2 is an enlarged vertical cross-sectional view showing an elongated plate being cleaned and conveyed according to my invention;

Throughout the description and various figures of the drawings like reference numerals refer to similar parts.

Figure 3:
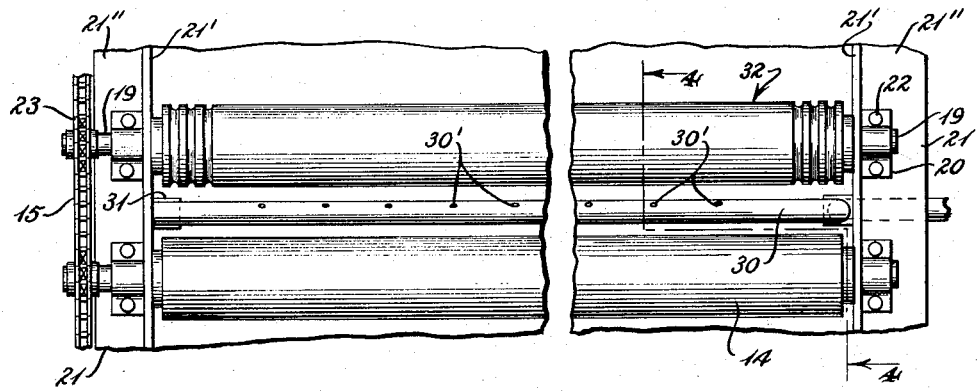
Fig. 3 is a fragmentary enlarged plan view of two power-driven rollers and an elongated spray tube positioned therebetween.

A conveyor apparatus is mounted on a framework generally indicated at 10 having vertical support posts 11, a top horizontal bed frame 12, and a lower horizontal platform 13. The top bed frame 12 includes two spaced-apart iron members 21—21 which have mounted thereon a plurality of spaced-apart, power-driven primary rollers 14 and secondary rollers 32 driven by an interconnecting chain 15 which is further powered by a motor 16 through a chain drive 17. Motor 16 is supported on a platform 18 affixed to the righthand end vertical posts 11, as a typical illustration of a power drive means. Rollers 14 and 32, see Fig. 3, have end trunnions 19 extending through vertical flanges 21' of side angle members 21 and supported in pillow box bearings 20 affixed to the horizontal flanges 21" of elongated side angle members 21 by means of bolts 22. The lefthand end of the rollers 14 and 32, see Fig. 3, have sprockets 23 mounted on their trunnions 19 and over these sprockets is threaded the endless drive chain 15.

Figure 4:
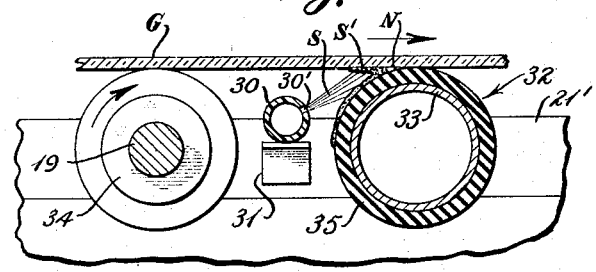
Fig. 4 is an enlarged sectional view along line 4—4 of Fig. 3.

Referring again to Fig. 1, positioned in the frame 10 and below the top of bed work 12 and the rollers is a collecting pan 24 whose bottom 24' slopes down to a central drain position 24". Supported on the lower platform 13 is a pump generally indicated at P driven by an electric motor 25 which collects fluid in a sump therein (not shown) by means of a drain pipe 26 affixed to the drain opening 24" in the drain pan 24. Mounted at the top of the drain pipe 25 and over the drain aperture 24" within tank 24 is a filter screen 27. Pump P has a discharge conduit 28 which connects with a manifold 29 extending along one side of the bed frame 12. Manifold 29 has connected thereto at spaced intervals, see Fig. 3, transversely extending elongated conduits 30 having spaced-apart orifices 30' therein which direct a spray as shown in Fig. 4 toward each of the secondary rollers 32. These conduits 30 are supported by end brackets 31 secured to the side channel frame upstanding flanges 21'.

In Fig. 4 the rolls 14 and 32 are shown supporting a glass plate G traveling from left to right where it has entered the conveyor and washer generally indicated at 10 at the lefthand end from the high speed run-in section of the grinding and polishing line. These rollers are rotated in a clockwise direction, as viewed in Fig. 4, and move the sheet of glass G from left to right. The sheet of glass has particles of plaster (not shown) on the bottom thereof which must be loosened and removed. There is shown in Fig. 2 a plurality of elongated spray tubes 30 which project a spray at the line of contact between the roller there adjacent in the direction of the spray and the glass plate G. This action of the spray S is best shown in Fig. 4. Roll 32 which will be described in more detail with respect to Fig. 5 hereinafter has peripheral contact with the underneath side of glass plate G at the nip portion N and at this line of contact there is collected a pool of cleaning fluid S' which extends across the underneath side of the glass plate G at the zone of contact. The liquid extends as a bath across the roll 32 and in order to interrupt the flow of the liquid endwise of the roll, guards or gaskets are provided as will hereinafter be explained.

Figure 5:
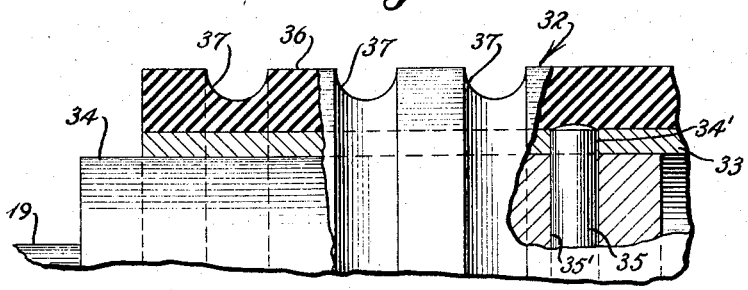
Fig. 5 is a fragmentary enlarged cross-sectional end view of the end structure of the rolls.

In Fig. 5 the roll 32 is shown to be made up of a tubular section 33 which as here typically illustrated has a four-inch outside diameter with a three-sixteenths inch wall thickness. Secured to each end of tube 33 is a shaft 34 having a reduced trunnion portion 19 on the end thereof. Shaft 34 fits tight within the end and is pinned thereto by a transverse pin 35 extending through suitable apertures 35' in the tube and 34' in the shaft. In addition, the shaft 34 may be tack welded to the tube 33 to afford an even more rigid construction. In the construction of the roll 32 there is shrunk thereover a rubber or elastomer covering which is preferably of 35 Shore durometer hardness, however, other hardnesses may be utilized for the covering ranging from about 30 to 50 Shore durometer. It is desired to have the rubber-coated rolls sufficiently rigid to support and convey plates thereon yet sufficiently yieldable to enhance the crumbling of plaster adhering to the underneath side of plates passed over such rolls. This covering is vulcanized to the roll and may be of the order of a half-inch in thickness. By vulcanizing the rubber its properties are enhanced to resist attack by fluids containing acid. Formed at the ends of the rubber covering 36 of the roll are spaced-apart annular grooves 37 of which there are three in number here illustrated. These grooves are of one-half inch diameter and have one-half inch spacings therebetween and from the end of the roll as here illustrated. These grooves serve to restrict the flow of the liquid endwise on the roll and thus prevent it seeping into the bearings and support structure. Any liquid falling from the roll falls downward into the trough 24 therebeneath and is filtered by the strainer 27 and recirculated by the pump P. A feature of the invention is that the spray nozzles 30' do not have to be positioned all the way out to the end of the rolls or for the full width of the glass being cleaned since the liquid sprayed therefrom contacts the roll 32 and moves endwise to distribute itself so as to provide a continuous pool S' of fluid in contact with the lower surface of the glass G. This feature is important since the lower surface of the glass G has deposits thereon of plaster of Paris or other setting material which must be loosened and removed from the lower surface. By affording a continuous pool for contact with these plaster of Paris particles on the underneath surface of the glass G, the reaction of the cleaning fluid, which may consist of a 3% hydrochloric acid solution, loosens up the plaster of Paris and enhances the crumbling of the plaster and its removal from the glass since a crushing action of the plaster takes place as the plate passes over the roll 32 and the subsequent rolls generally indicated at 14.

The arrangement of conveyor roller and spray means has greatly enhanced the cleaning of the plates of glass as the cleaning solution is in longer wetting contact with the plaster of Paris particles to be removed. This causes these plaster particles to crumble and the weight of the glass plate acting on the rollers crushes the plaster particles and loosens them so that they are removed. All action does not necessarily take place at the immediately adjacent roll to the spray but at this roll and the following rolls.

I claim as my invention:

1. In a conveyor and washer for elongated plates having encrusted coating to be loosened and removed therefrom comprising, in combination, a framework, a pair of horizontally disposed and spaced-apart primary rollers mounted on said framework and adapted to support and move the plates placed thereon, a secondary roller disposed between and spaced from said primary rollers and having contact with the lower face of the plates moved thereover, power means for rotating said primary rollers and secondary roller in one direction for movement of said plates, a spray nozzle disposed adjacent said secondary roller and in spaced relation below said plates and so constructed and arranged as to spray cleaning fluid only in the general direction of movement of the plates and into the line of contact between said secondary roller and the plates moving in contact thereover, whereby a pool of the cleaning fluid is deposited at the line of contact between said plate and said roller, said spray nozzle being spaced in from the end of said secondary roller, and a cleaning fluid supply under pressure connected with and supplying fluid to said spray nozzle, said secondary roller having a flexible rubber covering extending the full length thereof and with said cleaning fluid performing a combined mechanical and chemical loosening of said encrusted coating on said plates supported thereabove and moved therealong; said primary rollers having a hard surface and mechanically breaking up said encrusted coating.

2. The invention according to claim 1 wherein said flexible covering on the secondary roller has a hardness ranging from about 30 to 50 Shore durometers.

3. The invention according to claim 1 wherein said secondary roller has spaced apart annular grooves formed therein proximal to the ends thereof to prevent endwise escape of fluid therebeyond.

4. The invention according to claim 3 wherein said rollers are approximately four inches in diameter and said annular grooves are generally semi-cicrular in cross section and approximately one-half inch in diameter and having approximately one-half inch spacing therebetween axially along said secondary roller.

References Cited in the file of this patent
UNITED STATES PATENTS

| | | |
|---|---|---|
| 1,065,376 | Leitger | June 24, 1913 |
| 1,609,474 | Jacobson | Dec. 7, 1926 |
| 2,259,260 | Matteson | Oct. 14, 1941 |
| 2,297,976 | Nachtman | Oct. 6, 1942 |
| 2,650,603 | Howes | Sept. 1, 1953 |